(No Model.)

N. P. BRADISH.
KITCHEN CABINET.

No. 260,739. Patented July 11, 1882.

WITNESSES.
John Wiley.
G. Carroll.

INVENTOR.
Nelson P. Bradish,
per F. S. Davenport, Atty.

UNITED STATES PATENT OFFICE.

NELSON P. BRADISH, OF JERSEYVILLE, ILLINOIS.

KITCHEN-CABINET.

SPECIFICATION forming part of Letters Patent No. 260,739, dated July 11, 1882.

Application filed May 2, 1882. (No model.)

*To all whom it may concern:*

Be it known that I, NELSON P. BRADISH, of Jerseyville, in the county of Jersey and State of Illinois, have invented a new and Improved Kitchen-Cabinet; and I do hereby declare that the following is a full and exact description of the same, reference being had to the accompanying drawings, and to the letters of reference marked thereon.

The invention herein described relates to an improvement in kitchen-cabinets of that class designed to hold, in a series of drawers or chests, all the necessary ingredients and utensils for bread and pastry making and other uses, and differs from other pieces of kitchen-furniture heretofore in use for the same purpose in the details of the mode of supporting the oscillating drawers or chests, and also in the manner of attaching the bread-board to the top of the cabinet.

Figure 1:
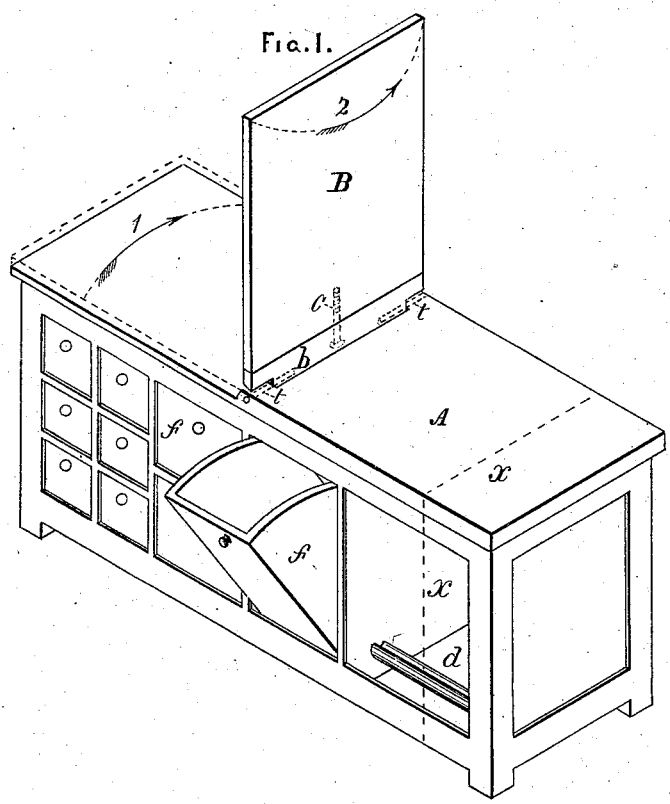
Figure 2:
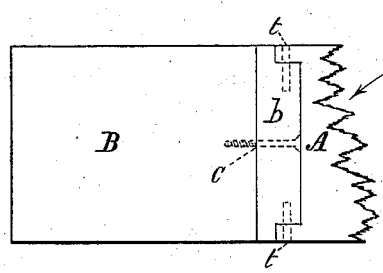
Figure 3:
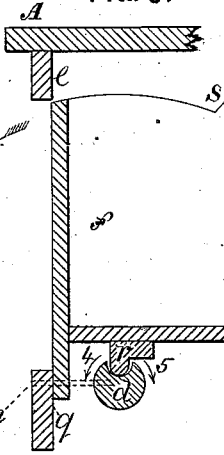
Figure 4:
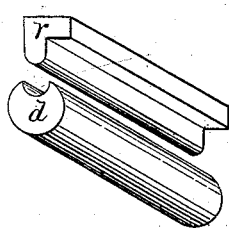

In the drawings, Figure 1 is a perspective view of the cabinet, showing one of the chests open and one of the chest-compartments as seen when the chest is removed, and also the bread-board in the act of being turned over, its position when in use being shown in dotted lines. Fig. 2 is a plan view of the bread-board, showing the manner in which it is connected with the fixed part of the top of the cabinet. Fig. 3 is a sectional side elevation, on a larger scale, of one of the chests as seen when closed, in connection with a part of the front of the cabinet, taken in the line $x\,x$, Fig. 1. Fig. 4 is a perspective view of the chest-supporter and the part of the chest that rests thereon, said parts being separated to show them more distinctly.

In Fig. 1, A represents the top of the cabinet, which in height is about equal to an ordinary table. Underneath said top is a series of chests or drawers, $f\,f$, &c., as shown in the figure, adapted to contain flour, meal, rice, spices, and other kitchen necessaries.

Each of the chests or drawers, instead of being made to slide in and out horizontally in the ordinary manner, is adapted to oscillate upon a horizontal bar secured in the walls of the compartments of the cabinet in a position parallel to the length thereof, in the lower part of each of the compartments containing the chests, as shown at $d$, Fig. 1. The manner in which the chests, which are all of the same construction, are supported will perhaps be better understood by reference to Fig 3, in which $d$ represents the end of the supporting-bar, grooved throughout the entire length of its upper side to receive the lower edge of the bar $r$, which is secured to the bottom of the chest, and is equal in length to the width of the chest. These parts are more fully shown in Fig. 4, which is a perspective view of the bar $r$ and the grooved supporting-bar $d$, the bar $r$ being lifted out of the groove in which it oscillates in order to exhibit more distinctly its form. The main object of this form of support is to provide a means for adjusting the distance between the center of oscillation of the chest and the inside of the lower part, $q$, of the front of the cabinet. When the chest is supported in the ordinary manner—that is, upon an iron rod or some other immovable equivalent—the lower part of the front of the chest has to be dressed down till a fit is secured. By the device here presented a perfect adjustment is much more easily and quickly effected by simply turning the supporting-bar $d$, Fig. 3, in its bearings to the right or left, as indicated by the arrows 4 and 5, until the required distance of the center of oscillation from the inside $q$ of the front of the cabinet is attained.

The bar $d$ is then secured permanently in position by a nail or screw driven from the front edge of the partition-wall into the supporting-bar, as shown at $h$. To open the chest it is simply tilted forward, as indicated by the arrow 3.

In order to prevent the chest falling too far forward when opened, the rear upper part thereof is provided with a projection, $s$, which, when the chest has sufficient forward pitch to afford the requisite opening, comes in contact with the inside of the front frame of the cabinet at $e$, and prevents further motion in that direction.

In regard to the top of the cabinet, it will be noticed that one half of it, the bread-board B, is so constructed that it may be turned upside down, and either side, when uppermost, be even with the fixed half.

It will be observed that to the center of the inner edge of the bread-board there is pivoted, at $c$, Fig. 2, a narrow cross-bar, $b$, of the same thickness as the bread-board, said cross-bar being in turn hinged, preferably by dowels *t t*, (shown in dotted lines in the drawing,) to the fixed half of the top of the cabinet in such manner that when the bread-board is raised to the vertical position, as indicated by the arrow No. 1, (shown in Fig. 1,) the cross-bar *b* will be turned to the vertical position with it. Matters being thus, it is only necessary to revolve the bread-board about the pivot *c*, as indicated by the arrow 2, in order to bring whichever side may be required uppermost when the board is returned to the horizontal position.

The object in making one half of the top of the cabinet to revolve is to have one side for the exclusive use of bread-making and other similar purposes requiring the most scrupulous cleanliness, while the opposite side may be used for ironing or any other purpose for which a common kitchen-table is usually employed.

What I claim as my invention, and desire to secure by Letters Patent, is—

1. In a kitchen-cabinet, the chest-supporter *d*, consisting of a round bar having a groove longitudinally cut in one side of it, in combination with the bar *r*, secured to the bottom of the chest and adapted to oscillate in the groove of the bar *d*, the latter being secured at its ends in the walls of the cabinet so as to admit of the adjustment herein referred to, for the purpose set forth.

2. In a kitchen-cabinet, the combination, with the bread-board, of the cross-bar *b*, pivoted at *c* to one end thereof, and hinged to the fixed half of the top of the cabinet in such manner that when turned to the vertical position the bread-board may be revolved about the pivot *c* as a vertical axis, so that either side of the bread-board may be uppermost when in a horizontal position.

This specification signed and witnessed this 24th day of April, 1882.

NELSON P. BRADISH.

Witnesses:
 J. O. HAMILTON,
 GEO. C. CARROLL.